(12) United States Patent
Meister et al.

(10) Patent No.: US 7,830,242 B2
(45) Date of Patent: Nov. 9, 2010

(54) DRIVER ASSISTANCE SYSTEM HAVING A DEVICE FOR DETECTING SPECIAL SITUATIONS

(75) Inventors: Dirk Meister, Moeglingen (DE); Fred Oechsle, Ludwigsburg (DE); Ulf Wilhelm, Rutesheim (DE); Martin Randler, Immenstaad (DE); Stephanie Arramon, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 11/795,727

(22) PCT Filed: Jan. 23, 2006

(86) PCT No.: PCT/EP2006/050371

§ 371 (c)(1),
(2), (4) Date: Apr. 4, 2008

(87) PCT Pub. No.: WO2006/084786

PCT Pub. Date: Aug. 17, 2006

(65) Prior Publication Data

US 2009/0021355 A1    Jan. 22, 2009

(30) Foreign Application Priority Data

Feb. 10, 2005    (DE) .................. 10 2005 005 970

(51) Int. Cl.
*B60Q 1/00* (2006.01)
*G08G 1/16* (2006.01)

(52) U.S. Cl. ............... 340/425.5; 340/436; 701/301
(58) Field of Classification Search ............ 340/436, 340/437, 933, 995.13, 988–996; 701/93–96, 701/301, 26, 36
See application file for complete search history.

(56) References Cited

U.S. PATENT DOCUMENTS

| 5,963,148 | A  | * | 10/1999 | Sekine et al. | ............... | 340/905 |
| 7,224,309 | B2 | * | 5/2007  | Shimomura | .................. | 342/70 |
| 2003/0125874 | A1 | * | 7/2003  | Fushiki et al. | ............. | 701/211 |
| 2004/0193374 | A1 | * | 9/2004  | Hac et al. | .................... | 701/301 |
| 2006/0190175 | A1 | * | 8/2006  | Moriizumi et al. | .......... | 701/301 |

FOREIGN PATENT DOCUMENTS

| EP | 0 892 281      | 1/1999 |
| WO | WO 03/031216   | 4/2003 |
| WO | WO 03/031217   | 4/2003 |

* cited by examiner

*Primary Examiner*—Jennifer Mehmood
(74) *Attorney, Agent, or Firm*—Kenyon & Kenyon LLP

(57) ABSTRACT

A driver assistance system includes a position finding system (12) for locating objects in the surroundings of a vehicle and at least one assistance function, as well as a device for recognizing special situations by recognizing a characteristic signature in at least one distribution of position finding data in a set of located objects.

11 Claims, 2 Drawing Sheets

DRIVER ASSISTANCE SYSTEM HAVING A DEVICE FOR DETECTING SPECIAL SITUATIONS

BACKGROUND OF THE INVENTION

1. Field of the Invention

The present invention relates to a driver assistance system having a position finding system for locating objects in the surroundings of a vehicle and having at least one assistance function.

2. Description of Related Art

Driver assistance systems which support the driver of a motor vehicle in driving the vehicle and/or warn him/her of dangerous situations, for example, an imminent collision, or automatically initiate measures for avoiding the collision or for mitigating the consequences of the collision are often based on a position finding system, in particular a radar or lidar system, using which objects in the surroundings of the vehicle, in particular other vehicles, may be located. Although the distances and relative velocities of the objects are measurable relatively accurately using such position finding systems, they do not allow a determination, or only allow a very rough determination, of the type of located objects in question. For example, using the radar echo of an object does not generally allow one to tell whether it originates from another vehicle, which requires a certain response of the assistance function, or from a tin can lying on the road, which is irrelevant for the assistance function.

A typical example of such a driver assistance system is an adaptive cruise control (ACC) system which allows the speed of the host vehicle to be regulated in such a way that a vehicle traveling ahead is followed at a reasonable distance. In the Z previously used ACC systems the problem of insufficient object detection has been generally eliminated by ignoring stationary targets, i.e., objects whose relative velocity is approximately equal to that of the host vehicle in absolute value. This is possible, since ACC systems are normally used on superhighways or other major roads, where no stationary obstacles on the road are to be expected. Since stationary objects, or very slow-moving vehicles are not detected in this way, or at least do not trigger a system response, a dangerous situation may arise in special cases such as when approaching the end of a traffic jam.

A BRIEF SUMMARY OF THE INVENTION

The present invention provides the advantage that, despite the limitations of the position finding system, it makes detection of such special situations possible, so that appropriate countermeasures may be initiated or at least a warning may be output to the driver.

The present invention is based on the principle that, while locating a single stationary object on the road is insufficient for inferring a potentially dangerous special situation, such situations may very well be detected when a set of a plurality of objects is considered together, and a characteristic signature is recognizable from the distribution of the position finding data such as distances, relative velocities, and/or relative accelerations, which indicate a certain class of special situations.

For example, when approaching the end of a traffic jam, usually a plurality of vehicles is in the position finding range of the radar sensor, and many of these vehicles will be moving at low speed or standing still. Another characteristic feature is that the vehicles traveling ahead and approaching the end of the traffic jam reduce their speed, and the closer they are to the end of the traffic jam, the slower they move. If the velocities of these vehicles are plotted against the distance, a characteristic signature is obtained in the form of a decreasing curve. Similarly a characteristic signature is also obtained for the relative accelerations of these vehicles.

According to the present invention, therefore, a conventional driver assistance system is supplemented by a device which accesses the position finding data and, in the case of a set of located objects, i.e., of at least two objects, looks for a characteristic signature of the above-mentioned type.

In particular, those position finding data are analyzed which relate to the longitudinal movement of the objects, i.e., their movement in the direction of travel of the host vehicle. Since radar sensors also have a certain angular resolution capability, it is also possible, however, to analyze the distribution of objects that meet certain criteria regarding longitudinal movement, across the width of the road.

Characteristic signatures for one or more predefined special situations may be stored in a situation library, so that they may be compared with currently recorded position finding data.

DETAILED DESCRIPTION OF THE INVENTION

Figure 1:
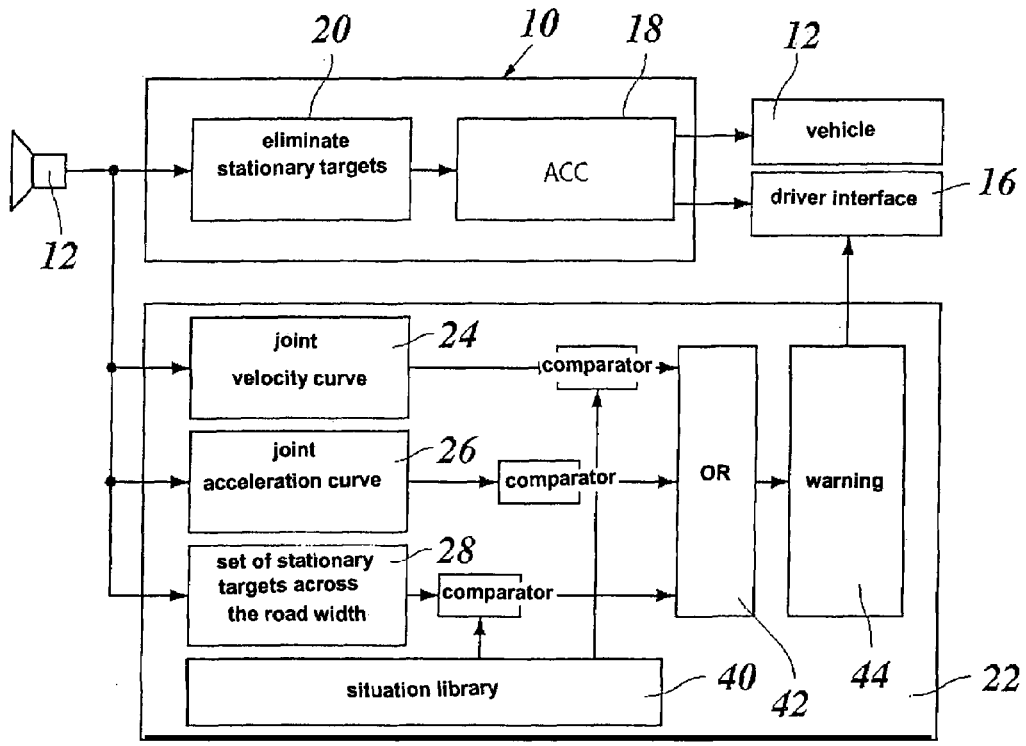
FIG. 1 shows a block diagram of a driver assistance system according to the present invention.

The driver assistance system shown in FIG. 1 includes first a conventional cruise controller 10, which analyzes position finding data of a radar sensor 12 to regulate the velocity of a vehicle 14 by intervening in the drive system or brake system. The cruise controller may also communicate with the driver via a driver interface 16. Since the mode of operation of cruise controller 10 as such is known, it is only represented in FIG. 1 as a simplified block having an actual ACC regulator 18 and an upstream processing stage 20, which is depicted separately here only for the sake of clarity, and is used for eliminating stationary targets. More precisely, this processing stage excludes from further processing any objects whose absolute velocity is lower than a certain threshold value.

A warning system 22, which accesses the position finding data of radar sensor 12 before the elimination of the stationary targets, is also provided for warning the driver of obstacles that may appear on highways, for example, of the end of a traffic jam or a road block. The relative velocities, relative accelerations, distances, and azimuth angles are thus registered by this warning system both for the moving targets and the stationary targets, a Y coordinate providing the position of the object in the transverse direction to the longitudinal road direction being calculated from the distance and azimuth angle. Three distributions 24, 26, 28, which are referred to here as "joint velocity curve," "joint acceleration curve," and "joint stationary targets across the road width," are generated from these data.

Figure 2:
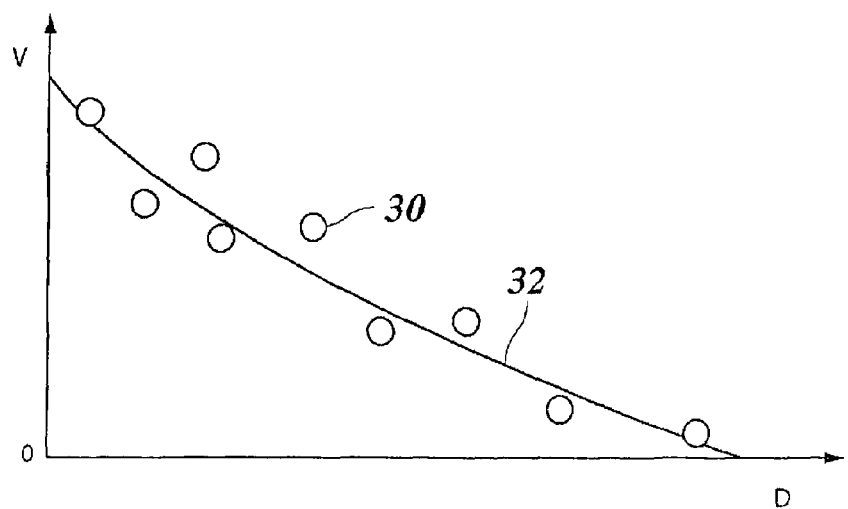
FIGS. 2 through 4 show diagrams of examples of characteristic signatures in the motion data of located objects.

FIG. 2 shows an example of distribution 24, in which absolute velocities V (calculated from the relative velocity and velocity of travel of the host vehicle) are plotted against measured distance D. The distribution according to FIG. 2 is typical for a situation where the host vehicle and a number of vehicles traveling ahead are approaching the end of a traffic jam. According to this graph, the vehicles traveling ahead reduce their velocity, the vehicles farthest in front being the slowest. The end of a traffic jam formed by stopped vehicles may also be already visible. Objects 30 are represented in FIG. 2 as circles, and curve 32 represents a fit providing the velocity distribution. The monotonously decreasing shape of curve 32 is a characteristic signature for an end of a traffic jam.

Figure 3:
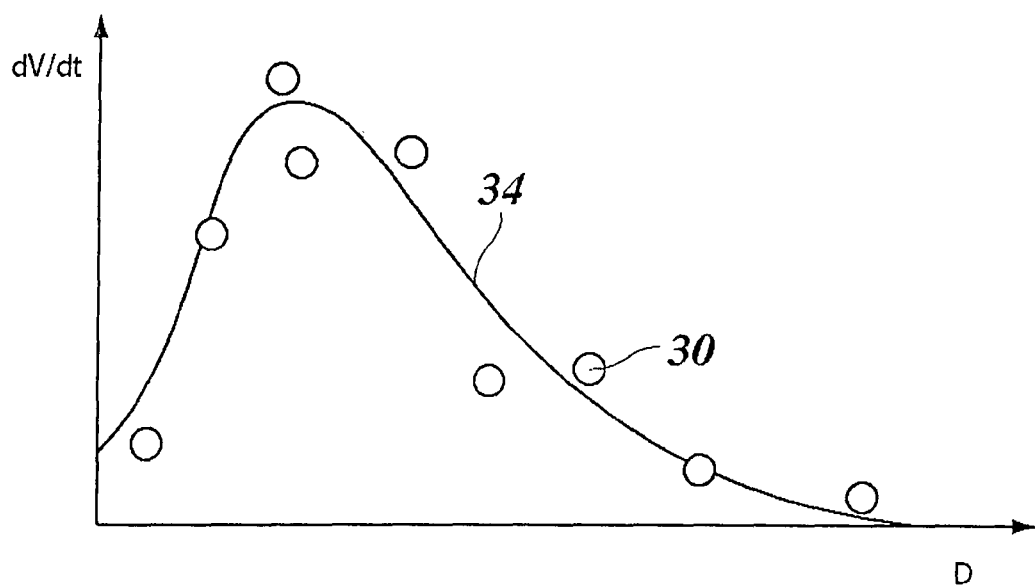

FIG. 3 shows an example of distribution 26. Here the relative velocities dV/dt of objects 30 are plotted against distance D. Curve 34 is a fit for this distribution and is characterized in that the accelerations (more precisely: decelerations) of the vehicles traveling ahead initially increase to a maximum with increasing distance and then drop to zero. This distribution corresponds to the same motion pattern of the vehicles traveling ahead as elucidated previously with reference to FIG. 2. A higher detection reliability is achieved by the simultaneous analysis of distributions 24 and 26.

Figure 4:
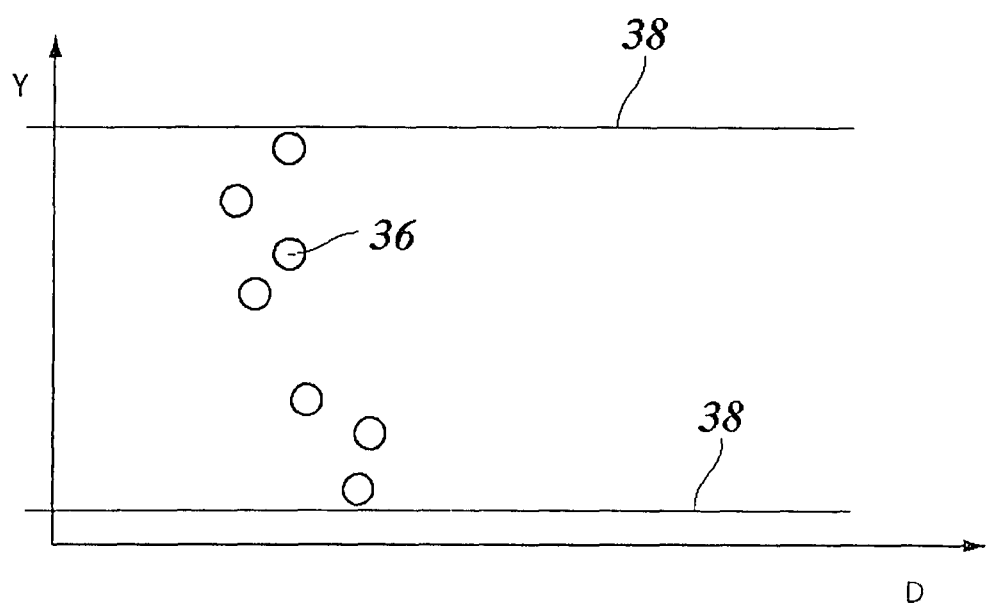

FIG. 4 shows an example of distribution 28, in which the Y coordinates of all stationary objects 36 are plotted against distance D. The left and right boundaries of the road are shown as straight lines 38. It is apparent that the stationary targets or stopped objects 36 form a kind of barrier across the entire width of the road at a certain distance. This corresponds to the typical configuration of an end of a traffic jam where the vehicles are backed up about the same distance on all lanes. The number of objects 36 may be greater than the number of actually existing stationary objects, since an individual vehicle may appear on the radar screen as a plurality of reflection targets interpreted as objects 36. Furthermore, two groups of objects may be identified in FIG. 4. The four objects having the greatest Y coordinates are at a somewhat shorter distance than the three objects having the smaller Y coordinates. This corresponds to the possibility that the traffic jam ends are at somewhat different distances on the different lanes and is also one of the characteristic signatures of an end of a traffic jam.

A distribution according to FIG. 4, in which all objects are approximately at the same distance, might correspond to a total closure of the road by police vehicles or barriers.

As FIG. 1 shows, the distributions depicted in FIGS. 2 through 4 for the individual sets are compared with data from a situation library 40 in a comparator KOMP. The characteristic signatures of an end of a traffic jam or, in general, for a situation to be recognized, are stored in this situation library. The situation library may be produced, for example, by simulating, a number of times, the situations to be recognized or by performing real-life-like experiments and recording the different distributions using a system which has an identical function as the one of FIG. 1, and subjecting them to a separate statistical analysis for each distribution type (averaging and determining tolerance limits).

If at least one of comparators KOMP determines a match of the distribution with a corresponding signature from situation library 40, a logical signal "1" or an OR gate 42 is output, which causes, via a warning signal device 44 and driver interface 16, an acoustic, optical, or kinesthetic signal to be output, so that the driver is warned of the danger situation.

Instead of OR gate 42, a more complex circuit may also be optionally used, which instead of logical signals, analyzes quantitative signals of comparator KOMP, which provide the degree of match of the measured distribution with the signature. The warning signal is triggered in this case if the sum of matches of all distributions 24, 26, and 28 with their corresponding signatures is greater than a certain threshold value. The degree of match provided by the comparator may also be a function of the number of individual objects included in the set in question. The number of objects regarded as a distribution should be at least two. A larger minimum number of objects reduces the risk of erroneous triggering.

What is claimed is:

1. A driver assistance system for a vehicle, comprising:
   a position finding system for detecting objects in the surroundings of the vehicle, wherein the position finding system acquires position finding data;
   at least one driver-assistance-function unit; and
   a device for determining a potentially dangerous situation by recognizing a characteristic feature in at least one distribution curve of position finding data for a set of detected objects;
   wherein:
      the potentially dangerous situation is an end of one of a traffic jam and a road block;
      the distribution curve includes position finding data of at least one of stationary and slow-moving objects not analyzed by the driver-assistance-function unit; and
      the at least one distribution curve provides velocities of detected objects as a function of measured distances of detected objects, and wherein the characteristic feature is a monotonous decrease in velocities with increasing distances.

2. The driver assistance system as recited in claim 1, further comprising:
   a situation library for storing the characteristic feature; and
   at least one comparator for comparing distribution of the position finding data with the characteristic feature.

3. The driver assistance system as recited in claim 1, wherein the device for determining a potentially dangerous situation includes a warning signal device for generating a warning signal when the potentially dangerous situation is determined.

4. A driver assistance system for a vehicle, comprising:
   a position finding system for detecting objects in the surroundings of the vehicle, wherein the position finding system acquires position finding data;
   at least one driver-assistance-function unit; and
   a device for determining a potentially dangerous situation by recognizing a characteristic feature in at least one distribution curve of position finding data for a set of detected objects;
   wherein:
      the potentially dangerous situation is an end of one of a traffic jam and a road block;
      the distribution curve includes position finding data of at least one of stationary and slow-moving objects not analyzed by the driver-assistance-function unit; and
      the at least one distribution curve provides relative accelerations of detected objects as a function of measured distances of detected objects, and wherein the characteristic feature includes an increase in the absolute value of the relative accelerations to a maximum, followed by a monotonous decrease in the relative accelerations, as a function of increasing distance.

5. The driver assistance system as recited in claim 4, further comprising:
   a situation library for storing the characteristic feature; and
   at least one comparator for comparing distribution of the position finding data with the characteristic feature.

6. The driver assistance system as recited in claim 4, wherein the device for determining a potentially dangerous situation includes a warning signal device for generating a warning signal when the potentially dangerous situation is determined.

7. A driver assistance system for a vehicle, comprising:
a position finding system for detecting objects in the surroundings of the vehicle, wherein the position finding system acquires position finding data;
at least one driver-assistance-function unit; and
a device for determining a potentially dangerous situation by recognizing a characteristic feature in at least one distribution curve of position finding data for a set of detected objects;
wherein:
the potentially dangerous situation is an end of one of a traffic jam and a road block;
the distribution curve includes position finding data of at least one of stationary and slow-moving objects not analyzed by the driver-assistance-function unit; and
the at least one distribution curve indicates respective coordinates of detected stationary objects in the direction transverse to the direction of travel of the vehicle, and wherein the characteristic feature includes a distribution of detected stationary objects across substantially the entire width of a roadway ahead of the vehicle.

8. The driver assistance system as recited in claim 7, further comprising:
a situation library for storing the characteristic feature; and
at least one comparator for comparing distribution of the position finding data with the characteristic feature.

9. The driver assistance system as recited in claim 7, wherein the device for determining a potentially dangerous situation includes a warning signal device for generating a warning signal when the potentially dangerous situation is determined.

10. A driver assistance system for a vehicle, comprising:
a position finding system for detecting objects in the surroundings of the vehicle, wherein the position finding system acquires position finding data;
at least one driver-assistance-function unit; and
a device for determining a potentially dangerous situation by recognizing a characteristic feature in at least one distribution curve of position finding data for a set of detected objects;
a situation library for storing the characteristic feature; and
at least one comparator for comparing distribution of the position finding data with the characteristic feature;
wherein:
the potentially dangerous situation is an end of one of a traffic jam and a road block;
the distribution curve includes position finding data of at least one of stationary and slow-moving objects not analyzed by the driver-assistance-function unit; and
the device for determining a potentially dangerous situation records a plurality of distributions of position finding data, and wherein a separate comparator is provided for each distribution, and wherein a device is provided for gating comparison results of the separate comparators.

11. The driver assistance system as recited in claim 10, wherein the device for determining a potentially dangerous situation includes a warning signal device for generating a warning signal when the potentially dangerous situation is determined.

* * * * *